No. 670,705. Patented Mar. 26, 1901.
F. M. ENGLE.
LAND MARKER.
(Application filed Nov. 22, 1900.)
(No Model.)

WITNESSES:

INVENTOR
Francis M. Engle
BY
ATTORNEYS

United States Patent Office.

FRANCIS MARION ENGLE, OF SWEETWATER, ILLINOIS.

LAND-MARKER.

SPECIFICATION forming part of Letters Patent No. 670,705, dated March 26, 1901.

Application filed November 22, 1900. Serial No. 37,340. (No model.)

*To all whom it may concern:*

Be it known that I, FRANCIS MARION ENGLE, a citizen of the United States, and a resident of Sweetwater, in the county of Menard and State of Illinois, have invented a new and Improved Land-Marker, of which the following is a full, clear, and exact description.

This invention relates to improvements in land-marker attachments for seeders and planters; and the object is to provide a device that may be readily applied to any seeding or planting machine and having a simple means for raising and lowering the land-marker and that may be operated by a person without leaving his seat on the machine, thus saving considerable time and labor.

I will describe a land-marker embodying my invention and then point out the novel features in the appended claims.

Reference is to be had to the accompanying drawings, forming a part of this specification, in which similar characters of reference indicate corresponding parts in both the figures.

Figure 1:
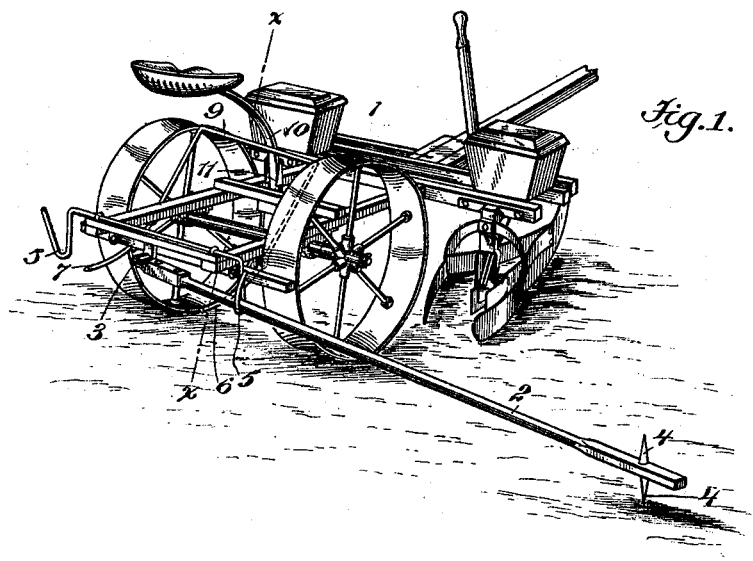
Figure 2:
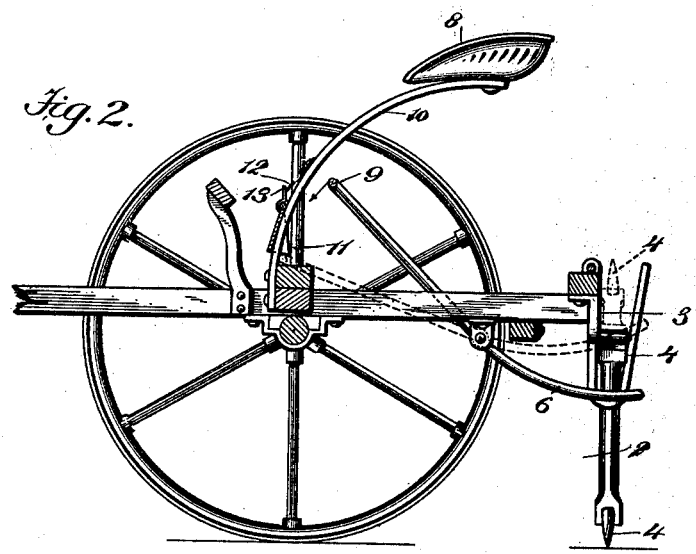

Figure 1 is a rear perspective view of a planter, showing a land-marker embodying my invention as applied thereto; and Fig. 2 is a longitudinal section substantially on the line $x\,x$ of Fig. 1.

Referring to the drawings, 1 designates a seeder or planter of any well-known construction and to which the land-marker is designed to be attached. The land-marker comprises a rod 2, pivotally connected, as here shown, to a hanger 3, attached to the rear portion of the machine-frame, so that said rod may be swung to either side of the machine. Marking-points 4 are extended in opposite directions from the end of the rod, and attached to the frame are stirrups or hooks 5, designed to support the rod from moving its outer end too far downward and from swinging forward.

Pivotally connected to the machine-frame are lifting-levers 6 7. These lifting-levers have rearwardly and downwardly extended portions designed to engage underneath the rod 2 between its pivotal point and a stirrup. The lever 6 is designed to lift the rod 2 when said rod is at the side shown in Fig. 1, while the lever 7 is designed to lift said rod when it is swung to the opposite side. These levers are designed to be operated by foot-pressure by a man on the seat 8, and while the levers may be independent one of the other I have here shown their inner ends connected by a bar 9. This bar 9 during its downward movement to raise the rod moves along the rear side of the spring-standard 10 for the seat, and it may be held in its downward position by engaging underneath a spring-pressed dog 11, attached to said standard 10. This spring-pressed dog has side pieces which engage against the opposite sides of the standard 10, and the rear edges of said side pieces are inclined downward and rearward, so that when the bar 9 is moved downward and engages with said side pieces the dog will be moved forward until the bar reaches the under end thereof, when a spring 12, attached to the standard 10 and engaging with an upwardly-extended portion 13 of the dog, will turn said dog to bring its lower end over the rod.

In operation when it is desired to raise the outer end of the rod 2 while turning in a field, or upon reaching a stump, or when moving the machine from one place to another the driver will place his foot on the bar 9, forcing it downward and consequently moving the rear end of the levers upward, which will of course elevate the outer end of the rod. When it is desired to again lower the rod, it is only necessary to release the bar 9 from the dog 11, when the rod will fall by gravity.

Having thus described my invention, I claim as new and desire to secure my Letters Patent—

1. A land-marker attachment for a seeder or planter, comprising a bar having swinging connection with the seeder or planter, a lever for engaging underneath said bar, the said lever being extended forward to be engaged with the driver's foot, and a stirrup on the machine-frame for receiving and supporting said bar, substantially as specified.

2. A land-marker attachment for a seeder or planter, comprising a bar mounted to swing thereon, stirrups at the opposite sides of the frame and with either one of which said bar may engage, levers attached to the opposite sides of the frame and extended downward and rearward to engage with said bar, a rod connecting the inner ends of said levers, and a device for fastening said rod in its lowermost position, substantially as specified.

3. A land-marker attachment for a seeder or planter, comprising a bar having swinging connection with the frame of the machine, stirrups at the opposite sides of the machine-frame for supporting the bar, levers pivoted to the machine-frame at opposite sides and having portions extended outward and rearward to engage the said bar, a rod connecting the inner ends of said levers, and a spring-pressed dog for engaging with said rod, substantially as specified.

4. A land-marker attachment for a planter or seeder, comprising a bar mounted to swing on the frame of the machine, stirrups for receiving and supporting said bar, levers pivoted to the opposite sides of the machine-frame for elevating said bar, a rod connection between the inner ends of said levers, and a locking device for the levers, comprising a spring-pressed dog pivoted to the machine-seat standard and having side portions at opposite sides of the standard, the said side portions having their rear edges inclined downward and rearward, substantially as specified.

In testimony whereof I have signed my name to this specification in the presence of two subscribing witnesses.

FRANCIS MARION ENGLE.

Witnesses:
SAMUEL ESTILL,
MOSES HUGHES.